US010888856B2

(12) United States Patent
Kimata et al.

(10) Patent No.: US 10,888,856 B2
(45) Date of Patent: Jan. 12, 2021

(54) HONEYCOMB STRUCTURE

(71) Applicant: NGK INSULATORS, LTD., Nagoya (JP)

(72) Inventors: Takefumi Kimata, Nagoya (JP); Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/378,968

(22) Filed: Apr. 9, 2019

(65) Prior Publication Data
US 2019/0314802 A1 Oct. 17, 2019

(30) Foreign Application Priority Data

Apr. 13, 2018 (JP) ................................. 2018-077842
Feb. 27, 2019 (JP) ................................. 2019-034935

(51) Int. Cl.
*B01J 35/04* (2006.01)
*B01D 53/94* (2006.01)
(Continued)

(52) U.S. Cl.
CPC .............. *B01J 35/04* (2013.01); *B01D 53/94* (2013.01); *B01J 21/06* (2013.01); *B01J 27/224* (2013.01);
(Continued)

(58) Field of Classification Search
CPC ............. H05B 2203/024; F01N 3/2013; F01N 3/2026; F01N 2260/10; F01N 3/2828; B01J 35/04; B01D 53/94; B01D 53/885
See application file for complete search history.

(56) References Cited

U.S. PATENT DOCUMENTS

2005/0153534 A1* 7/2005 Kikuchi .............. H01H 1/0206
438/618
2013/0062328 A1* 3/2013 Shimoda .................. H05B 3/08
219/201
(Continued)

FOREIGN PATENT DOCUMENTS

JP 2011-230971 A1 11/2011
JP 2014-051402 A1 3/2014
JP 2014051402 A * 3/2014 ............. B01D 53/86

OTHER PUBLICATIONS

Encyclopedia Britannica, "Bentonite", published Apr. 16, 2019, Encyclopedia Britannica, Inc., p. 1 <https://www.britannica.com/science/bentonite> (Year: 2019).*

(Continued)

*Primary Examiner* — Robert Clemente
(74) *Attorney, Agent, or Firm* — Burr & Brown, PLLC

(57) ABSTRACT

A honeycomb structure including:
  a pillar-shaped honeycomb structure portion having an outer peripheral wall and partition walls disposed on an inner side of the outer peripheral wall and defining a plurality of cells extending from one end face to another end face to form flow paths; and at least an electrode portion disposed on an outer surface of the outer peripheral wall of the pillar-shaped honeycomb structure portion, wherein
  the pillar-shaped honeycomb structure portion is formed of ceramics containing either or both of Si and SiC,
  the electrode portion contains either or both of a metal and a metal compound in addition to an oxide, and
  a volume ratio of the oxide on an inner peripheral side of the electrode portion is higher than a volume ratio of the oxide on an outer peripheral side of the electrode portion.

14 Claims, 3 Drawing Sheets

(51) Int. Cl.
  *B01J 21/06* (2006.01)
  *B01J 27/224* (2006.01)
  *F01N 3/20* (2006.01)
  *H05B 3/03* (2006.01)
  *F01N 3/28* (2006.01)

(52) U.S. Cl.
  CPC ......... *F01N 3/2026* (2013.01); *F01N 3/2828* (2013.01); *H05B 3/03* (2013.01); *F01N 2330/06* (2013.01); *H05B 2203/016* (2013.01)

(56) References Cited

U.S. PATENT DOCUMENTS

| | | | |
|---|---|---|---|
| 2015/0007553 A1* | 1/2015 | Omiya | F01N 3/2013 60/274 |
| 2016/0281570 A1* | 9/2016 | Mori | F01N 3/2013 |
| 2018/0280872 A1* | 10/2018 | Noro | B23K 1/0014 |

OTHER PUBLICATIONS

Chemical Book, "Silicon Chemical Properties", 2017, Chemical Book, p. 1 <https://www.chemicalbook.com/ProductChemicalPropertiesCB4720557_EN.htm> (Year: 2017).*

Chemical Book, "Bentonite Chemical Properties", 2017, Chemical Book, p. 1 <https://www.chemicalbook.com/ProductChemicalPropertiesCB6902360_EN.htm> (Year: 2017).*

Chemical Book, "Silicon Carbide Chemical Properties", 2017, ChemicalBook, p. 1 <https://www.chemicalbook.com/ProductChemicalPropertiesCB2431905_EN.htm> (Year: 2017).*

Chemical Book, "Methyl Cellulose Chemical Properties", 2017, Chemical Book, p. 1 <https://www.chemicalbook.com/ChemicalProductProperty_EN_CB3474718.htm> (Year: 2017).*

Encyclopedia Britannica, "Alumina," Nov. 28, 2018, Encyclopdia Britannica, p. 1 (Year: 2018).*

Hobart M. King, "Cordierite and the Gem Known as 'Iolite'", 2020, Geology.com, pp. 1-2 (Year: 2020).*

* cited by examiner

[FIG.1]
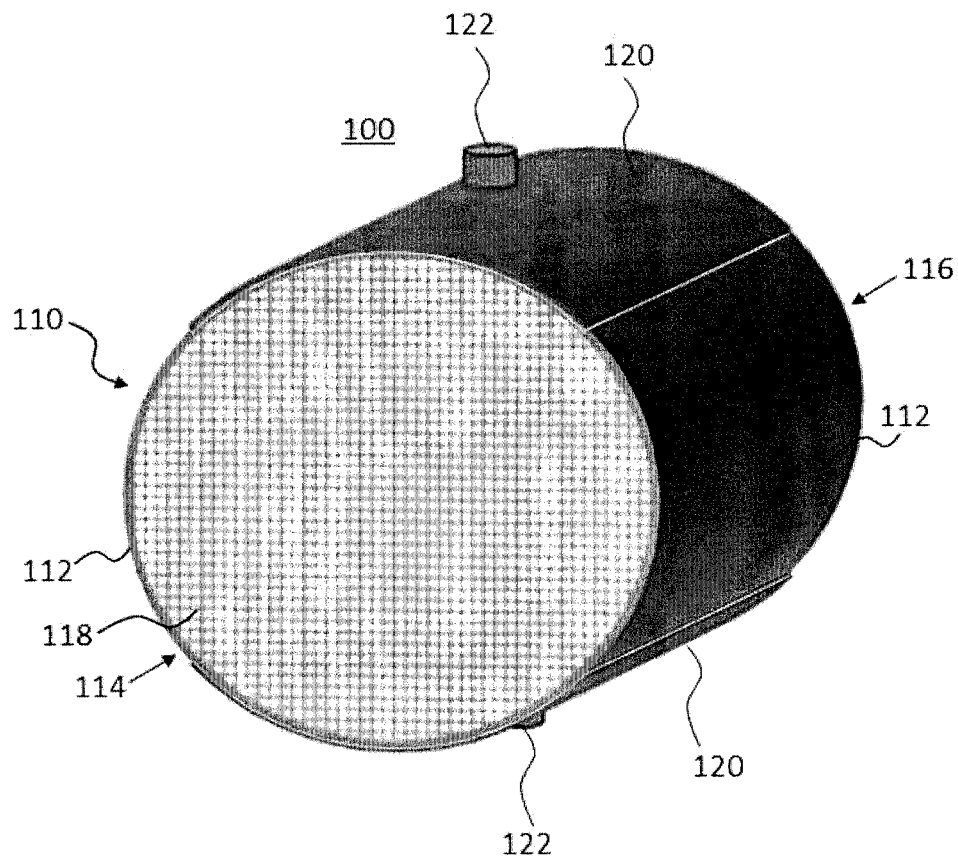
[FIG. 2]
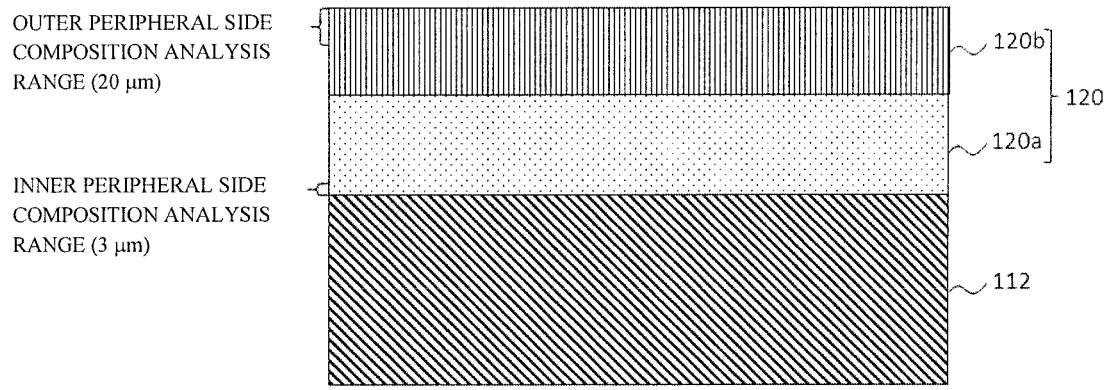

[FIG. 3]
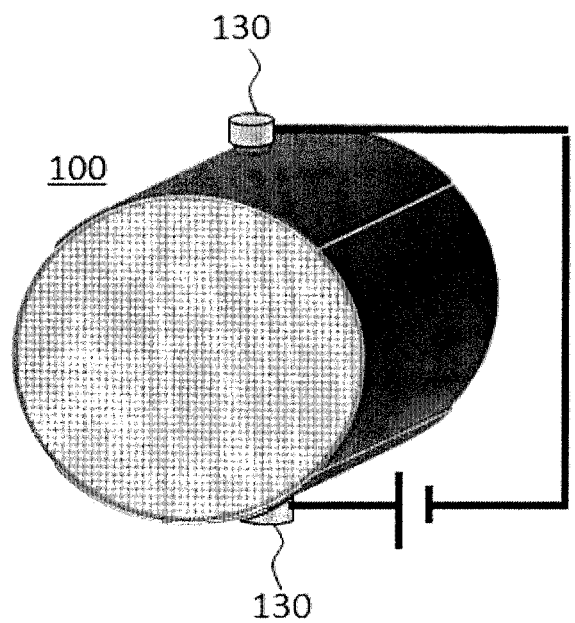
[FIG. 4]
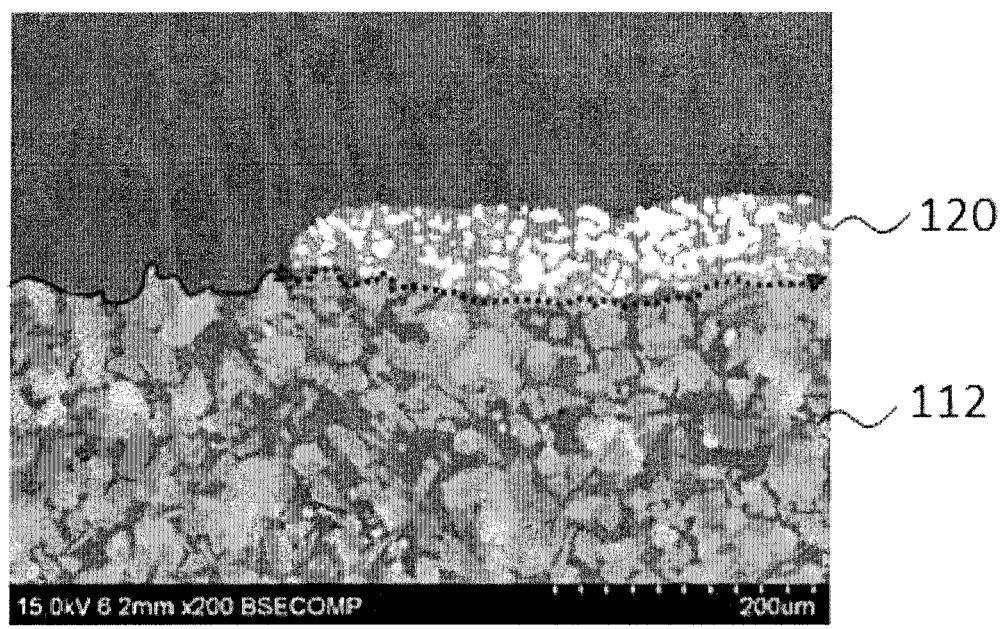

[FIG.5]
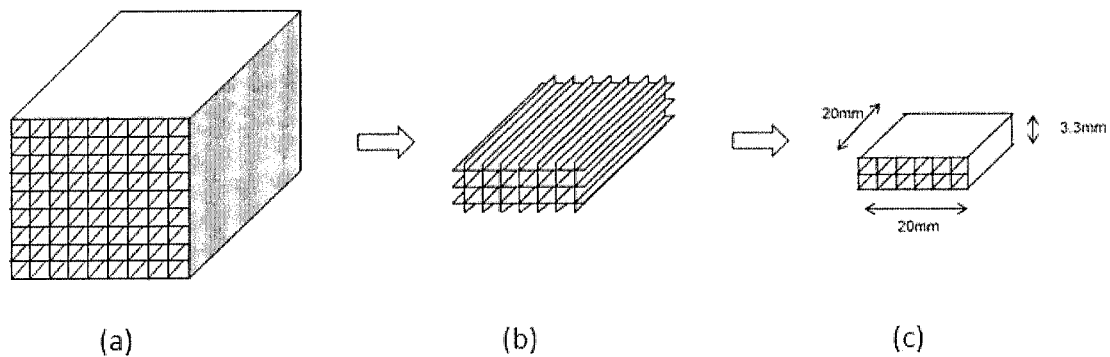
(a)　　　　　　(b)　　　　　　(c)
[FIG.6]
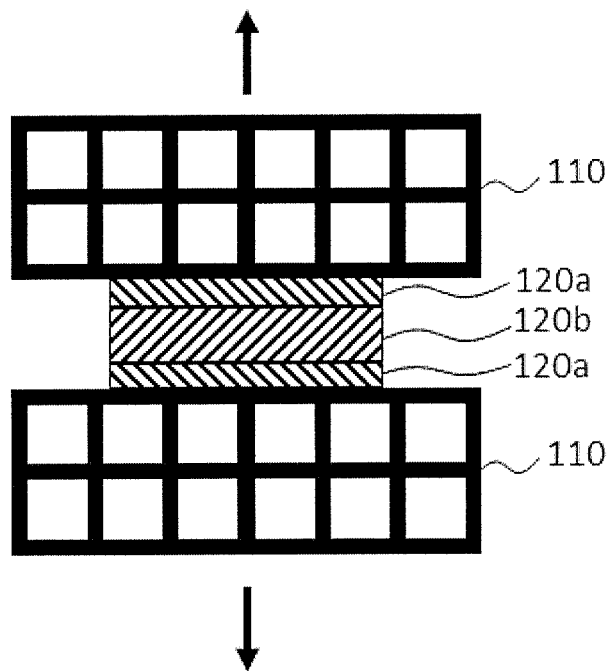

HONEYCOMB STRUCTURE

TECHNICAL FIELD

Field of the Invention

The present invention relates to a honeycomb structure, and more particularly to a honeycomb structure which is capable of performing a function of a catalyst carrier, and also performing a function of a heater when a voltage is applied to the honeycomb structure.

Background Art

Heretofore, a honeycomb structure made of ceramics has been used, for example, as an electric heating type catalyst (EHC) for purification of exhaust gas, or a substrate for a ceramic heater. Such a use application is accompanied by an operation in which a metal terminal is connected to the honeycomb structure and a voltage is applied to the terminal, thereby heating the honeycomb structure. For example, the EHC serves as an exhaust gas purification device which is disposed in an exhaust path of a car or the like to purify an exhaust gas emitted from an engine. A catalyst is loaded onto this EHC device. When the EHC device is heated, the loaded catalyst is heated to a temperature required for activation.

The honeycomb structure is made of ceramics. Therefore, the metal terminal is often connected to the honeycomb structure via an electrode portion containing a metal component and formed on a circumferential surface of the honeycomb structure. In this case, a bonding reliability between the honeycomb structure and the electrode portion has heretofore been considered as a problem.

In Japanese Patent Laid-Open No. 2014-51402 (Patent Literature 1), there is suggested a honeycomb structure including a honeycomb ceramic body containing metal Si and a bonding portion bonded to an outer peripheral wall of this ceramic body. This bonding portion is a member to suitably bond a metal material such as a wire harness to the ceramic body. The bonding portion includes a diffusion layer containing a metal silicide as a main component and located on an outer peripheral face (side face) of the ceramic body, and a metal layer formed on the diffusion layer. It is described that the diffusion layer of the bonding portion is securely bonded to the ceramic body, and the above metal material is suitably bonded to the metal layer of the bonding portion since the main component constituting the metal layer of the bonding portion is the metal component.

Furthermore, in Japanese Patent Laid-Open No. 2011-230971 (Patent Literature 2), a bonded body is suggested which is made of ceramics and a metal for the purpose of securing heat resistance and bonding reliability in a high temperature environment, and securing ohmic contact properties. Specifically, it is suggested that the bonded body includes a ceramic body made of a compound containing at least Si, and a metallic body bonded to a surface of the ceramic body, and the above metallic body contains at least Cr, and a metal element (e.g., Fe, Mo, Ni and W) having a higher Si diffusion coefficient than Cr, and has a thermal expansion coefficient of $11\times10^{-6}/°$ C. or less. In a bonding interface between the above ceramic body and the above metallic body, a diffusion bonding region is formed which contains Si, Cr and the above metal element.

CITATION LIST

Patent Literature

[Patent Literature 1] Japanese Patent Laid-Open No. 2014-51402

[Patent Literature 2] Japanese Patent Laid-Open No. 2011-230971

SUMMARY OF INVENTION

According to Patent Literature 1, a raw material containing a metal component and used to form a bonding portion is disposed on a side face of a ceramic body, which is pressurized and fired. Consequently, the metal component in the raw material used to form the bonding portion is mixed and reacted with metal Si in the ceramic body, so that a diffusion layer is formed.

According to Patent Literature 2, a metallic body contains at least Cr and a metal element having a higher Si diffusion coefficient than Cr, and has a thermal expansion coefficient of $11\times10^{-6}/°$ C. or less. The metallic body is disposed on a surface of a ceramic body made of a compound that contains Si, and the metallic body is heated in this state. Consequently, the above metallic body is bonded and formed onto the surface of the ceramic body, and a diffusion bonding region containing Si, Cr and the above metal element is formed in a bonding interface between the metallic body and the ceramic body.

It can be considered that in each of the literatures, a bonding reliability is enhanced by a technology of mutually diffusing Si in the ceramic body and the metal component in the bonding portion or the metallic body. However, if the diffusion layer or the diffusion bonding region is thin, an effect of improving a bonding strength may be exerted, but an initial strength cannot be acquired due to a thermal expansion difference between the ceramic body and the diffusion layer or the diffusion bonding region, or due to change in volume during formation of the diffusion layer. Furthermore, when a honeycomb structure is repeatedly energized and heated and the diffusion layer or the diffusion bonding region continues to grow for a long period of time, there is also a concern that the bonding portion or the metallic body peels off from the ceramic body, and that an energization resistance increases.

The present invention has been made to solve the above problems, and one of objects of the present invention is to improve a bonding reliability between a honeycomb structure portion and an electrode portion by an approach that is different from a conventional approach.

The present inventors have earnestly conducted studies to achieve the above object, and have found that it is effective to provide a high oxide concentration region for prevention of diffusion in an inner peripheral side of an electrode portion, which is in a vicinity of an interface with an outer peripheral wall of a honeycomb structure portion. The present invention has been completed on the basis of the finding and will be illustrated below.

[1]

A honeycomb structure including a pillar-shaped honeycomb structure portion having an outer peripheral wall and partition walls disposed on an inner side of the outer peripheral wall and defining a plurality of cells extending from one end face to the other end face to form flow paths; and at least an electrode portion disposed on an outer surface of the outer peripheral wall of the pillar-shaped honeycomb structure portion, wherein the pillar-shaped honeycomb structure portion is formed of ceramics containing either or both of Si and SiC, the electrode portion contains either or both of a metal and a metal compound in addition to an oxide, and a volume ratio of the oxide on an inner peripheral side of the electrode portion is higher than a volume ratio of the oxide on an outer peripheral side of the electrode portion.

[2]

The honeycomb structure according to [1], wherein a difference between the volume ratio of the oxide on the inner peripheral side of the electrode portion and the volume ratio of the oxide on the outer peripheral side of the electrode portion is 5% or more.

[3]

The honeycomb structure according to [1] or [2], wherein the volume ratio of the oxide on the inner peripheral side of the electrode portion is 65% or more.

[4]

The honeycomb structure according to any one of [1] to [3], wherein the volume ratio of the oxide on the outer peripheral side of the electrode portion is 80% or less.

[5]

The honeycomb structure according to any one of [1] to [4], wherein an average thickness of the electrode portion is from 25 to 300 μm.

[6]

The honeycomb structure according to any one of [1] to [5], wherein the electrode portion contains an oxide of one or more elements selected from a group consisting of B, Mg, Al, Si, P, Ti and Zr.

[7]

The honeycomb structure according to [6], wherein the electrode portion contains an oxide of one or more elements selected from a group consisting of Mg, Al and Si.

[8]

The honeycomb structure according to any one of [1] to [7], wherein at least a part of the oxide in the electrode portion is crystalline.

[9]

The honeycomb structure according to any one of [1] to [8], wherein either or both of the metal and the metal compound contained in the electrode portion include one or more selected from a group consisting of stainless steel, nickel-chromium alloy, TaC, TiN and $ZrB_2$.

[10]

The honeycomb structure according to any one of [1] to [9], wherein either or both of the metal and the metal compound contained in the electrode portion include flat particles of a metal and/or a metal compound having an aspect ratio of from 2 to 100.

[11]

The honeycomb structure according to any one of [1] to [10], wherein an energization resistance is 40Ω or less.

[12]

The honeycomb structure according to any one of [1] to [11], wherein a volume ratio of an oxide in the pillar-shaped honeycomb structure portion is lower than the volume ratio of the oxide on the inner peripheral side of the electrode portion.

[13]

The honeycomb structure according to any one of [1] to [12], wherein a volume ratio of an oxide in the pillar-shaped honeycomb structure portion is 35% or less.

[14]

The honeycomb structure according to any one of [1] to [13], wherein a volume ratio of metal silicon in the pillar-shaped honeycomb structure portion is 20% or more.

According to one embodiment of a honeycomb structure of the present invention, an initial bonding reliability and a long-term bonding reliability between a honeycomb structure portion and an electrode portion improve. Consequently, for example, there can be provided an EHC and a ceramic heater which both have an excellent durability, and in which an electric resistance is hard to increase even after use for a long period of time.

BRIEF DESCRIPTION OF THE DRAWINGS

FIG. 1 is a perspective view schematically showing one embodiment of a honeycomb structure according to the present invention.

FIG. 2 is a schematic cross-sectional view explaining a bonding state between an outer peripheral wall and an electrode portion in the embodiment of the honeycomb structure according to the present invention.

FIG. 3 is a schematic view explaining a method of measuring an energization resistance.

FIG. 4 is an SEM image showing an example of a method of specifying an interface between the electrode portion and the outer peripheral wall of a honeycomb structure portion.

FIG. 5 is a schematic view for explanation of a procedure of preparing a testing honeycomb structure portion for use in performing a bonding reliability test.

FIG. 6 is a schematic view for explanation of a laminated structure of a testing laminated body.

DESCRIPTION OF THE PREFERRED EMBODIMENTS

Next, embodiments of the present invention will be described in detail with reference to the drawings. It should be understood that the present invention is not limited to the following embodiments and that design change, improvement and the like are suitably added to the present invention on the basis of ordinary knowledge of a person skilled in the art without departing from the spirit of the present invention.

(1) Honeycomb Structure

FIG. 1 is a perspective view schematically showing one embodiment of a honeycomb structure according to the present invention. FIG. 2 is a schematic cross-sectional view explaining a bonding state between an outer peripheral wall and an electrode portion in the embodiment of the honeycomb structure according to the present invention. In the embodiment of the present invention, a honeycomb structure 100 includes a pillar-shaped honeycomb structure portion 110 having an outer peripheral wall 112 and partition walls 118 disposed on an inner side of the outer peripheral wall 112 and defining a plurality of cells extending from one end face 114 to the other end face 116 to form flow paths, and at least an electrode portion 120 bonded to an outer surface of the outer peripheral wall 112 of the pillar-shaped honeycomb structure portion 110. The electrode portion 120 has an inner peripheral side 120a having a high volume ratio of an oxide, and an outer peripheral side 120b having a low volume ratio of the oxide.

(1-1 Honeycomb Structure Portion)

The pillar-shaped honeycomb structure portion is made of ceramics containing either or both of Si (metal silicon) and SiC (silicon carbide) so that the honeycomb structure portion advantageously serves for electrical heating. Examples of the ceramics containing either or both of Si and SiC may include a silicon-silicon carbide composite material, a silicon-oxide composite material, a silicon carbide-oxide composite material, and silicon-silicon carbide-silicon nitride composite material. Note that in the present invention, a material of the pillar-shaped honeycomb structure portion made only of Si will be also referred to as ceramics as long as it is a sintered body.

In the pillar-shaped honeycomb structure portion that advantageously serves for the electrical heating, a total volume ratio of Si and SiC is more preferably 60% or more, even more preferably 80% or more, and even more preferably 95% or more.

Examples of the other ceramics that can be contained in the honeycomb structure portion may include, but not limited to, ceramics such as cordierite, mullite, zircon, aluminum titanate, silicon nitride, zirconia, spinel, indialite, saphirin, corundum, and titania. The other ceramics may be used alone, or two or more of the ceramics may be combined for use.

A volume ratio of Si in the ceramics forming the honeycomb structure portion can be, for example, from 1 to 100%. The volume ratio of Si in the ceramics is preferably 20% or more, more preferably 40% or more, and even more preferably 90% or more, because silicon melts at a low temperature and easily forms a conductive path.

A volume ratio of SiC in the ceramics forming the honeycomb structure portion can be, for example, from 0 to 99%. A melting temperature of SiC is high, and hence bonding of SiC to SiC requires a high temperature at which the conductive path is formed. To solve this problem, from a viewpoint of easily forming the conductive path also at a low temperature, the lower volume ratio of SiC in the ceramics is more preferable. Specifically, the volume ratio of SiC in the ceramics is preferably 70% or less, more preferably 50% or less, and even more preferably 5% or less.

The ceramics forming the honeycomb structure portion may contain an oxide. There are not any special restrictions on the oxide, and an example of the oxide is an oxide of one or more elements selected from a group consisting of B, Mg, Al, Si, P, Ti and Zr. Among the oxides, the oxide of one or more elements selected from a group consisting of Mg, Al and Si is preferable from a viewpoint of low thermal expansion. Specific examples of the oxide include an oxide of one element, for example, MgO, $SiO_2$ or $Al_2O_3$ as well as an oxide of two or more elements (a composite oxide) such as $2MgO.2Al_2O_3.5SiO_2$ (cordierite) that is a compound of MgO, $SiO_2$ and $Al_2O_3$, or $AlTiO_5$ (aluminum titanate) that is a compound of $Al_2O_3$ and $TiO_2$. One of the oxides may be used alone, or two or more of the oxides may be combined for use. However, when the volume ratio of the oxide in the ceramics is high, energization is obstructed. Therefore, the volume ratio is preferably 60% or less and more preferably 35% or less. The volume ratio of the oxide in the ceramics can be lower than a volume ratio of an oxide on the inner peripheral side of the electrode portion as described later.

A thermal expansion coefficient of the honeycomb structure portion 110 is preferably from 3.5 to 6.0 ppm/K and further preferably from 3.5 to 4.5 ppm/K from a viewpoint of a thermal shock resistance. In the present description, the thermal expansion coefficient indicates a linear thermal expansion coefficient of from 25 to 800° C. which is measured by a method that conforms to JIS R1618:2002 unless otherwise specified. As a thermal dilatometer, "TD5000S (tradename)" manufactured by Bruker AXS is usable.

The honeycomb structure portion can be energized to generate heat due to Joule heat when a voltage is applied between a pair of electrode portions. Consequently, the honeycomb structure can be suitably used as a heater. The voltage to be applied is preferably from 12 to 900 V, but the voltage to be applied can be suitably changed. Furthermore, when a catalyst is loaded onto the honeycomb structure portion, the honeycomb structure can be used as an EHC.

There are not any special restrictions on a volume resistivity of the honeycomb structure portion as long as heat can be generated by Joule heat. The volume resistivity of the honeycomb structure portion may be selected suitably in accordance with a use application for which the honeycomb structure is to be used. Illustratively, the volume resistivity of the honeycomb structure portion can be from 0.01 to 200 Ωcm, and is preferably from 0.05 to 50 Ωcm and further preferably from 0.1 to 5 Ωcm. Here, the volume resistivity of the honeycomb structure portion is a value measured at room temperature (25° C.) by a four-terminal method.

The partition walls can be porous. In this case, there are not any special restrictions on a porosity of the partition walls of the honeycomb structure portion, and the porosity can be, for example, from 35 to 60% and is preferably from 35 to 45%. The porosity is a value measured with a mercury porosimeter.

There are not any special restrictions on an average pore diameter of the partition walls of the honeycomb structure portion, and the average pore diameter can be, for example, from 2 to 15 μm and is preferably from 3 to 8 μm. The average pore diameter is a value measured with the mercury porosimeter.

A thickness of the partition walls 118 in the honeycomb structure portion can be, for example, from 0.1 to 0.3 mm, and is preferably from 0.1 to 0.15 mm.

A cell density in a cross section perpendicular to a flow path direction of the cells can be, for example, from 40 to 150 cells/cm² and is preferably from 60 to 100 cells/cm².

There are not any special restrictions on a cell shape in a cross section perpendicular to the flow path direction of the cells, and it is preferable that the cell shape be a quadrangular shape, a hexagonal shape, an octagonal shape, or any combination of these shapes. Among these shapes, a square and a hexagon are preferable. When the cells are formed in such a shape, pressure loss during passing of an exhaust gas through the honeycomb structure decreases, and a purification performance of the catalyst becomes excellent.

There are not any special restrictions on an outer shape of the honeycomb structure portion as long as the honeycomb structure portion is pillar-shaped. Examples of the outer shape may include a pillar shape having a round end face (a cylindrical shape), a pillar shape having an oval end face, and a pillar shape having a polygonal end face (e.g., a quadrangular, pentagonal, hexagonal, heptagonal, or octagonal end face). Furthermore, as for a size of the honeycomb structure portion, an area of the end face is preferably from 2000 to 20000 mm² and further preferably from 4000 to 15000 mm² from the viewpoint of the thermal shock resistance. Additionally, a length of the honeycomb structure portion in a central axis direction is preferably from 30 to 200 mm and further preferably from 30 to 120 mm from the viewpoint of the thermal shock resistance.

(1-2 Electrode Portion)

The honeycomb structure 100 according to the present embodiment includes at least one electrode portion 120 bonded to the outer surface of the outer peripheral wall 112 of the pillar-shaped honeycomb structure portion 110. In a preferred embodiment, a pair of electrode portions 120 are extended in a strip shape in the flow path direction of the cells on the outer surface of the outer peripheral wall 112 of the honeycomb structure portion 110 across a central axis of the honeycomb structure portion 110. Consequently, in the honeycomb structure 100, when a voltage is applied between the pair of electrode portions 120, bias of a current flowing through the honeycomb structure portion 110 can be suppressed, and bias of a temperature distribution in the honeycomb structure portion 110 can be thus suppressed. A terminal connecting portion 122 may be provided on each electrode portion 120 to facilitate connection to terminals.

The electrode portion can contain an oxide. There are not any special restrictions on the oxide to be contained in the electrode portion, and examples of the oxide include an oxide of one or more elements selected from a group consisting of B, Mg, Al, Si, P, Ti, Zr, Pb, Li, Na, Ba, Ca, Fe and Sr, and preferably an oxide of one or more elements selected from a group consisting of B, Mg, Al, Si, P, Ti and Zr. Among the oxides, an oxide of one or more elements selected from a group consisting of Mg, Al and Si is more preferable from the viewpoint of the low thermal expansion. Specific examples of the oxide include an oxide of one element such as MgO, $SiO_2$ or $Al_2O_3$, as well as an oxide of two or more elements (a composite oxide) such as $2MgO.2Al_2O_3.5SiO_2$ (cordierite) that is a compound of MgO, $SiO_2$ and $Al_2O_3$; crystallized glass containing cordierite as a main component, for example, MgO—SiO—$Al_2O_3$—$B_2O_3$; and $AlTiO_5$ (aluminum titanate) that is a compound of $Al_2O_3$ and $TiO_2$. From a viewpoint of improving durability at a high temperature, it is preferable that at least a part of the oxide in the electrode portion be crystalline. One type of oxide may be singly used, or two or more types of the oxides may be combined for use.

It is preferable that at least a part of the oxide contained in the electrode portion, particularly at least a part of the oxide contained on an inner peripheral side of the electrode portion be glass in a raw material stage. This is because glass easily becomes wet at a low temperature with the outer surface of the outer peripheral wall of the pillar-shaped honeycomb structure portion, and improves bonding strength. From this viewpoint, it is preferable that the electrode portion, particularly the inner peripheral side of the electrode portion contain an oxide of one or more elements selected from a group consisting of Si, P and B that are easy to vitrify. A softening point of glass is preferably 1600° C. or less and more preferably 1200° C. or less so that glass can soften at a low temperature. From the viewpoint of improving the durability at the high temperature, it is preferable that at least a part of the oxide in the electrode portion contain crystallized glass.

The electrode portion can contain either or both of a metal and a metal compound (other than the oxide) in addition to the oxide. In the present embodiment, the electrode portion contains an oxide phase, and a dispersion phase including either or both of a metal and a metal compound dispersed in the oxide phase.

There are not any special restrictions on the metal, but examples of the metal include Fe, Cr, Ni, Pt, Ru, Mo and W. The electrode portion may contain an alloy of at least one alloy element selected from a group consisting of the above metals. Examples of the metal compound include metal borides such as CrB, $CrB_2$, $ZrB_2$, $TaB_2$, $NbB_2$, WB and MoB; metal carbides such as WC, $Mo_2C$, TiC, SiC and TaC; nitrides such as TiN, ZrN, NbN, TaN, $Cr_2N$ and VN; and metal silicides such as $TiSi_2$, $Ti_5Si_3$, $ZrSi_2$, $TaSi_2$, $NbSi_2$, $CrSi_2$, $WSi_2$, $MoSi_2$, $VSi_2$, $FeSi_2$, $Ni_2Si$, and $CoSi_2$. The metal or the metal compound may be used alone, or two or more metals or metal compounds may be combined for use. In a preferred embodiment, either or both of the metal and the metal compound contained in the electrode portion may be one or more selected from a group consisting of stainless steel, nickel-chromium alloy, TaC, TiN and $ZrB_2$.

There are not any special restrictions on a particle shape of the metal and/or the metal compound constituting the dispersion phase. In a preferred embodiment, however, the dispersion phase contains flat particles of the metal and/or the metal compound having an aspect ratio of from 2 to 100. A content ratio of the flat particles of the metal and/or the metal compound having the aspect ratio of 2 to 100 in the dispersion phase is preferably 30 vol % or more, more preferably 50 vol % or more, even more preferably 70 vol % or more, and most preferably 90 vol % or more. The aspect ratio indicates a ratio ($L_2/L_1$) of Feret diameter $L_2$ of each particle in a direction vertical to a thickness direction to Feret diameter $L_1$ of the particle in the thickness direction of the electrode portion, when the electrode portion including the particles of the metal or the metal compound as measurement targets is observed in a cross section of the electrode portion in a direction perpendicular to the flow path direction of the cells. Note that definition of the thickness direction of the electrode portion will be described later.

Since the dispersion phase contains such flat particles, an electric resistance in the direction vertical to the thickness direction of the electrode portion easily lowers. Consequently, it is possible to obtain an advantage that a distribution of a current flowing through the honeycomb structure portion can be easily broadened, even when the volume ratio of the metal and/or the metal compound is decreased (i.e., even when the volume ratio of the oxide is increased). The increase of the volume ratio of the oxide in the electrode portion (the decrease of the volume ratio of the metal and/or the metal compound) is preferable from a viewpoint of improving long-term bonding reliability to repetition of energization heating, because a thermal expansion difference between the honeycomb structure and the electrode portion decreases. The content ratio of the flat particles of the metal and/or the metal compound having an aspect ratio of from 2 to 100 in the dispersion phase is obtained by observing the above cross section at a magnification of 500 times (1280×960 pixels) by use of a scanning electron microscope (SEM), and obtaining an area ratio of the flat particles of the metal and/or the metal compound having the aspect ratio of from 2 to 100 to a total area of the particles of the metal and/or the metal compound constituting the dispersion phase. This area ratio is considered as the volume ratio. Volume ratios are measured in fields of view of arbitrary five or more regions, and an average value of the ratios is considered as a measurement value.

It is preferable that the average value of the aspect ratios of the flat particles of the metal and/or the metal compound having the aspect ratio of from 2 to 100 in the dispersion phase be 2 or more, because the electric resistance easily lowers. Furthermore, the average value of the aspect ratios is preferably 30 or less and more preferably 10 or less because the particles can be easily mixed with the oxide. The average value of the aspect ratios is obtained on the basis of aspect ratios of arbitrary 30 particles of the metal and/or the metal compound having the aspect ratio of from 2 to 100 during the observation of the cross section with the SEM as described above.

The electrode portion 120 has the inner peripheral side 120a in which a volume ratio of the oxide is high, and the outer peripheral side 120b in which a volume ratio of the oxide is low. The electrode portion on the inner peripheral side contains the oxide with a higher concentration than the electrode portion on the outer peripheral side contains, so that metal components can be prevented from diffusing mutually from the honeycomb structure portion and the electrode portion. This leads to improvements of initial and long-term bonding reliabilities between the honeycomb structure and the electrode portion, and this also contributes to stability of heat generation performance, that is, the electric resistance is hard to rise even after use for a long period of time.

The volume ratio of the oxide on the inner peripheral side of the electrode portion is preferably 65% or more and is more preferably 80% or more or can be 100% from a viewpoint of improving a diffusion prevention effect. Furthermore, a volume ratio of the metal and the metal compound (excluding the metal oxide) on the inner peripheral side of the electrode portion is preferably 35% or less and more preferably 20% or less from the viewpoint of improving the diffusion prevention effect.

On the other hand, it is desirable that the outer peripheral side of the electrode portion has a low electric resistance to broaden the distribution of the current flowing through the honeycomb structure portion. Consequently, the lower volume ratio of the oxide on the outer peripheral side of the electrode portion is more preferable. In consequence, it is desired that the volume ratio of the oxide on the outer peripheral side of the electrode portion be lower than the volume ratio of the oxide on the inner peripheral side of the electrode portion. A volume ratio difference between the volume ratio of the oxide on the inner peripheral side of the electrode portion and the volume ratio of the oxide on the outer peripheral side of the electrode portion is preferably 5% or more, more preferably 10% or more, even more preferably 20% or more, and even more preferably 30% or more. Furthermore, the volume ratio of the oxide on the outer peripheral side of the electrode portion is specifically preferably 80% or less, more preferably 70% or less and even more preferably 60% or less.

The electrode portion on the outer peripheral side does not have to contain the oxide. However, the volume ratio of the oxide on the outer peripheral side of the electrode portion is preferably 10% or more, more preferably 30% or more, and even more preferably 40% or more, from viewpoints of improving an affinity with the inner peripheral side of the electrode portion and improving the bonding reliability between the inner peripheral side and the outer peripheral side of the electrode portion.

The volume ratio of the metal and the metal compound (excluding the metal oxide) on the outer peripheral side of the electrode portion is preferably 10% or more, more preferably 20% or more and even more preferably 30% or more from a viewpoint of decreasing the electric resistance of the electrode portion.

An average thickness of the electrode portion is preferably 25 µm or more, more preferably 50 µm or more and even more preferably 75 µm or more from a viewpoint of improving uniform heat generation properties. Furthermore, the average thickness of the electrode portion is preferably 300 µm or less, more preferably 250 µm or less, and even more preferably 150 µm or less from a viewpoint of preventing cracks and peel-off from being generated by firing.

The thickness direction of the electrode portion indicates a direction orthogonal to an average straight line of a curved line drawn by an interface between the electrode portion and the outer peripheral wall of the honeycomb structure portion, when a region of the electrode portion, for which thicknesses are to be measured, is observed in a cross section perpendicular to the flow path direction of the cells in a field of view (about 190 µm×250 µm) at a magnification of 500 times (1280×960 pixels) by use of the scanning electron microscope (SEM). When the thickness is so large that the entire thickness cannot be completely observed in one field of view, a plurality of fields of view may be observed. The interface between the electrode portion and the outer peripheral wall of the honeycomb structure portion can be specified from an SEM image and a mapping image that will be described later.

As shown in FIG. 1, in the honeycomb structure 100 of the present embodiment, each of the pair of electrode portions 120 is formed in a strip shape extending from one end face to the other end face of the honeycomb structure portion 110 in the flow path direction of the cells. Thus, the pair of electrode portions 120 are disposed across the both end faces of the honeycomb structure portion 110. Consequently, when a voltage is applied between the pair of electrode portions 120, the bias of the current flowing through the honeycomb structure portion 110 can be more effectively suppressed. Furthermore, when the bias of the current flowing through the honeycomb structure portion 110 is suppressed, the bias of the temperature distribution in the honeycomb structure portion 110 can be more effectively suppressed. When "each of the pair of electrode portions 120 is formed in the strip shape extending from one end face to the other end face of the honeycomb structure portion 110 in the flow path direction of the cells", it is meant that one end of each of the respective electrode portions 120 in the cell flow path direction comes in contact with a peripheral edge of the one end face 114 of the honeycomb structure portion 110, and the other end of each of the respective electrode portions 120 in the cell flow path direction comes in contact with a peripheral edge of the other end face 116 of the honeycomb structure portion 110.

In one embodiment of the honeycomb structure according to the present invention, an energization resistance can be set to 40Ω or less. The energization resistance is determined with the following measurement conditions. Each of terminals 130 is connected to each electrode portion at a central portion in an extending direction of the cells and in a circumferential direction of the honeycomb structure portion (see FIG. 3). Subsequently, a voltage of 30 V is applied between both the terminals, and then a resistance value is determined on the basis of a value of the current after the elapse of 30 seconds. The energization resistance is preferably 20Ω or less and is more preferably 10Ω or less, and can be, for example, from 2 to 40Ω.

(1-3 Measurement Method of Volume Ratio)

In the present invention, the volume ratios of the oxide, metal silicon (Si) and silicon carbide (SiC) of the honeycomb structure portion are measured by the following procedure. First, the honeycomb structure portion in the cross section perpendicular to the flow path direction of the cells is imaged in the field of view (about 190 µm×250 µm) at the magnification of 500 times (1280×960 pixels) by use of the scanning electron microscope (SEM), and oxygen elements, silicon elements and carbon elements are mapped by using an energy dispersive X-ray spectrometer (EDS). Then, the oxide is specified from an oxygen detecting section, metal silicon (Si) is specified from a region where only silicon is detected, and silicon carbide (SiC) is specified from a region where silicon and carbon are detected.

Next, a region of each component is extracted in image analysis by use of image analysis software (e.g., "Image-Pro Plus 7.0J (tradename)" manufactured by Media Cybernetics, Inc.), and area ratios of the oxide, metal silicon (Si) and silicon carbide (SiC) in a skeleton (a portion excluding voids) of the honeycomb structure portion are calculated. These ratios are considered as volume ratios of the oxide, metal silicon (Si) and silicon carbide (SiC) of the honeycomb structure portion. The volume ratios are measured in a field of view of arbitrary five or more regions, and an average value of the ratios is considered as a measurement value.

In the present invention, the volume ratios of the oxide, and the metal and metal compound (excluding the metal oxide) on the inner peripheral side of the electrode portion are measured by the following procedure. First, a vicinity of the interface between the electrode portion and the outer peripheral wall of the honeycomb structure portion in a cross section perpendicular to the flow path direction of the cells is imaged in the field of view at the magnification of 500 times (1280×960 pixels) by use of the scanning electron microscope (SEM), and the oxygen elements, silicon elements and carbon elements are mapped by using the energy dispersive X-ray spectrometer (EDS), to specify the interface between the electrode portion and the outer peripheral wall of the honeycomb structure portion. When it is difficult to specify the interface between the electrode portion and the outer peripheral wall of the honeycomb structure portion, as shown in FIG. 4, the interface may be specified by extrapolating from the outer surface position of the outer peripheral wall of the honeycomb structure portion in a region where the electrode portion is not present. Note that the magnification of an SEM photograph of FIG. 4 is 200 times, but in actual, the magnification to specify the interface is set to 500 times so that the interface is easily specified.

Subsequently, by use of the mapping image, the oxide is specified from the oxygen detecting section on the inner peripheral side of the electrode portion, and the metal and the metal compound are specified from an oxygen non-detecting section. When the mapping image is utilized, it is possible to specify a composition of components that constitute the oxide, and the metal and metal compound. In the present invention, when the volume ratio of each component on the inner peripheral side of the electrode portion is analyzed, it may be difficult to determine a boundary between the inner peripheral side and the outer peripheral side. Consequently, when the volume ratio is analyzed, a range having a size of 3 μm in the thickness direction from the interface between the electrode portion and the outer peripheral wall of the honeycomb structure portion toward the outer peripheral side of the electrode portion is considered as the inner peripheral side (see FIG. 2).

Next, the volume ratio is analyzed by using the image analysis software (e.g., "Image-Pro Plus 7.0J (tradename)" manufactured by Media Cybernetics, Inc.), the area ratios of the oxide, and the metal and metal compound in a skeleton (a portion excluding voids) on the inner peripheral side of the electrode portion are calculated. These ratios are considered as volume ratios of the oxide, and the metal and metal compound of the electrode portion, respectively. The volume ratios are measured in a field of view of arbitrary five or more regions, and an average value of the ratios is considered as a measurement value.

In the present invention, the volume ratios of the oxide, and the metal and metal compound (excluding the metal oxide) on the outer peripheral side of the electrode portion are measured by the following procedure. First, a vicinity of the outer peripheral side of the electrode portion in the cross section perpendicular to the flow path direction of the cells is imaged in the field of view at the magnification of 500 times (1280×960 pixels) by use of the scanning electron microscope (SEM), and the oxygen elements are mapped by using the energy dispersive X-ray spectrometer (EDS), to specify the oxide from the oxygen detecting section and specify the metal and the metal compound from the oxygen non-detecting section. When the mapping image is utilized, it is also possible to specify the composition of the components constituting the oxide, and the metal and metal compound. In the present invention, when the volume ratio of each component on the outer peripheral side of the electrode portion is analyzed, it may be difficult to determine the boundary between the inner peripheral side and the outer peripheral side. Consequently, when the volume ratio is analyzed, a range having a size of 20 μm in the thickness direction from the outermost surface of the electrode portion toward the inner peripheral side of the electrode portion is considered as the outer peripheral side (see FIG. 2).

Next, the volume ratio is analyzed by using the image analysis software (e.g., "Image-Pro Plus 7.0J (tradename)" manufactured by Media Cybernetics, Inc.), and area ratios of the oxide, and the metal and metal compound in the skeleton (the portion excluding the voids) on the outer peripheral side of the electrode portion are calculated. These ratios are considered as volume ratios of the oxide, and the metal and metal compound in the electrode portion, respectively. The volume ratios are measured in a field of view of arbitrary five or more regions, and an average value of the ratios is considered as a measurement value.

(2) Manufacturing Method of Honeycomb Structure

Next, a method of manufacturing the honeycomb structure of the present invention will be illustratively described. However, the manufacturing method of the honeycomb structure of the present invention is not limited to a manufacturing method described below.

According to one embodiment of the present invention, a manufacturing method of the honeycomb structure includes a step of obtaining a fired honeycomb structure portion; a step of coating, on the outer surface of the outer peripheral wall of the honeycomb structure portion, paste or slurry to form the inner peripheral side of the electrode portion; a step of firing the paste or slurry to form the inner peripheral side of the electrode portion, thereby forming the inner peripheral side of the electrode portion; a step of coating, on the inner peripheral side of the electrode portion, paste or slurry to form the outer peripheral side of the electrode portion; and a step of firing the paste or slurry to form the outer peripheral side of the electrode portion, thereby forming the outer peripheral side of the electrode portion.

Furthermore, according to another embodiment of the present invention, a manufacturing method of the honeycomb structure includes a step of obtaining a fired honeycomb structure portion; a step of coating, on the outer surface of the outer peripheral wall of the honeycomb structure portion, paste or slurry to form the inner peripheral side of the electrode portion; a step of coating, on the paste or slurry to form the inner peripheral side of the electrode portion, paste or slurry to form the outer peripheral side of the electrode portion; and a step of firing the paste or slurry to form the inner peripheral side of the electrode portion and the paste or slurry to form the outer peripheral side of the electrode portion, thereby simultaneously forming the inner peripheral side of the electrode portion and the outer peripheral side of the electrode portion.

Additionally, according to still another embodiment of the present invention, a manufacturing method of the honeycomb structure includes a step of obtaining a honeycomb formed body; a step of coating paste or slurry to form the inner peripheral side of the electrode portion on the outer surface of the outer peripheral wall of the honeycomb formed body; a step of coating paste or slurry to form the outer peripheral side of the electrode portion, on the paste or slurry to form the inner peripheral side of the electrode portion; and a step of firing the honeycomb formed body, the paste or slurry to form the inner peripheral side of the electrode portion, and the paste or slurry to form the outer peripheral side of the electrode portion, thereby simultaneously forming the fired honeycomb structure portion, the inner peripheral side of the electrode portion and the outer peripheral side of the electrode portion.

(2-1 Step of Obtaining Fired Honeycomb Structure Portion)

The step of obtaining the fired honeycomb structure portion will be described. The present step is performed by preparing the honeycomb formed body that is a precursor of the pillar-shaped honeycomb structure portion and firing this honeycomb formed body. The preparation of the honeycomb formed body can be performed in conformity with a process of preparing a honeycomb formed body in a known manufacturing method of a honeycomb structure. For example, first, in addition to ceramics raw materials such as silicon carbide powder (silicon carbide) and metal silicon powder (metal silicon), a binder, a surfactant, a pore former, water and others are mixed to prepare a forming raw material. An average particle diameter of the ceramics raw materials can be, for example, from 3 to 50 μm. The average particle diameter of the ceramics raw materials indicates an arithmetic average diameter on a volume basis when a frequency distribution of the particle sizes is measured by laser diffractometry.

Examples of the binder include methylcellulose, hydroxypropyl methylcellulose, hydroxypropoxyl cellulose, hydroxyethyl cellulose, carboxymethyl cellulose, and polyvinyl alcohol. Among these examples, it is preferable to use methylcellulose together with hydroxypropoxyl cellulose. It is preferable that a content of the binder be from 2 to 15 parts by mass, when a total mass of the silicon carbide powder and the metal silicon powder is 100 parts by mass.

It is preferable that a content of the water be from 20 to 60 parts by mass, when the total mass of the silicon carbide powder and the metal silicon powder is 100 parts by mass.

As the surfactant, ethylene glycol, dextrin, fatty acid soap, polyalcohol or the like may be used. One type of the surfactants may be singly used, or two or more of the surfactants may be combined for use. It is preferable that a content of the surfactant be from 0.1 to 2.0 parts by mass, when the total mass of the silicon carbide powder and the metal silicon powder is 100 parts by mass.

There are not any special restrictions on the pore former when the pore former forms pores after fired, and examples of the pore former include graphite, starch, a foamable resin, a water absorbable resin, and silica gel. It is preferable that a content of the pore former be from 0.5 to 10.0 parts by mass, when the total mass of the silicon carbide powder and the metal silicon powder is 100 parts by mass. It is preferable that an average particle diameter of the pore former be from 10 to 30 The average particle diameter of the pore former indicates the arithmetic average diameter on a volume basis when a frequency distribution of the particle sizes is measured by laser diffractometry. When the pore former is the water absorbable resin, the average particle diameter of the pore former is the average particle diameter of the pore former that has absorbed water.

Next, the obtained forming raw material is kneaded to form a green body, and then the green body is extruded to prepare the honeycomb formed body. During the extrusion, a die, for example, having a desired overall shape, cell shape, partition wall thickness and cell density may be used. Next, it is preferable to dry the obtained honeycomb formed body. Hereinafter, the dried honeycomb formed body may be referred to as "a honeycomb dried body". When a length of the honeycomb formed body (or the honeycomb dried body) in a central axis direction is not a desired length, both end portions of the honeycomb formed body may be cut to obtain the desired length of the honeycomb formed body.

Next, the obtained honeycomb formed body is fired to obtain a fired honeycomb structure portion. To remove the binder and others prior to the firing, the honeycomb formed body may be calcinated. As firing conditions, it is preferable that the honeycomb formed body be heated at 1350 to 1500° C. in an inert atmosphere of nitrogen, argon or the like for 1 to 20 hours. Furthermore, after the firing, it is preferable to perform an oxidation treatment at 1000 to 1300° C. for 1 to 10 hours for the purpose of improving a durability. There are not any special restrictions on calcinating and firing methods, and the firing may be performed by using an electric furnace, a gas furnace or the like.

(2-2 Step of Coating Paste or Slurry to Form Inner Peripheral Side of Electrode Portion)

The step of coating the paste or slurry to form the inner peripheral side of the electrode portion will be described. First, a binder, surfactant, water and others are added to oxide powder such as crystallized glass, and kneaded to prepare the paste or slurry to form the inner peripheral side of the electrode portion. Either or both of metal powder and metal compound powder may be added as required. Each of average particle diameters of the oxide powder, the metal powder and the metal compound powder can be, for example, from 1 to 50 μm. These average particle diameters indicate the arithmetic average diameter on a volume basis when a frequency distribution of the particle sizes is measured by laser diffractometry. Furthermore, when either or both of the metal powder and the metal compound powder are added, it is desirable to add the powder so that flat particles of the metal and/or the metal compound are included.

As the binder, the same type of binder as described in a corresponding paragraph of the honeycomb structure portion can be used. It is preferable that a content of the binder be from 0 to 10 parts by mass when a total mass of the oxide powder, the metal powder and the metal compound powder is 100 parts by mass.

It is preferable that a content of the water be from 0 to 500 parts by mass, when the total mass of the oxide powder, the metal powder and the metal compound powder is 100 parts by mass.

As the surfactant, the same type of surfactant as described in a corresponding paragraph of the honeycomb structure portion can be used. It is preferable that a content of the surfactant be from 0.1 to 2.0 parts by mass, when the total mass of the oxide powder, the metal powder and the metal compound powder is 100 parts by mass.

Next, the obtained paste or slurry to form the inner peripheral side of the electrode portion is coated in a desired thickness on the outer surface of the outer peripheral wall of the fired honeycomb structure portion. The coating thickness can be, but not limited to, from 3 to 200 μm and typically from 3 to 100 μm. It is preferable to coat the paste or slurry so that in the electrode portion, a longitudinal direction of the flat particles of the metal and/or the metal compound is oriented perpendicularly to the thickness direction of the electrode portion. A specific example of the coating method is a screen-printing method in which a shear force is applied in the peripheral direction along an outer peripheral direction of the electrode portion.

(2-3 Step of Firing Paste or Slurry to Form Inner Peripheral Side of Electrode Portion)

After the paste or slurry to form the inner peripheral side of the electrode portion is coated, the paste or slurry to form the inner peripheral side of the electrode portion is fired. To remove the binder and others prior to the firing, calcination may be performed. As firing conditions, it is preferable to perform heating at 950 to 1300° C. in an inert atmosphere of nitrogen, argon, vacuum or the like for 10 minutes to 120 minutes.

The paste or slurry to form the inner peripheral side of the electrode portion may be fired after the paste or slurry to form the outer peripheral side of the electrode portion is coated on the paste or slurry to form the inner peripheral side of the electrode portion. Alternatively, the paste or slurry to form the inner peripheral side of the electrode portion may be fired simultaneously with the firing of the honeycomb formed body.

(2-4 Step of Coating Paste or Slurry to Form Outer Peripheral Side of Electrode Portion)

The step of coating the paste or slurry to form the outer peripheral side of the electrode portion will be described. First, a binder, surfactant, water and others are added to either or both of metal powder and metal compound powder, and are kneaded to prepare the paste or slurry to form the outer peripheral side of the electrode portion. Oxide powder such as crystallized glass may be added as required. Each of average particle diameters of the oxide powder, the metal powder and the metal compound powder can be, for example, from 1 to 50 µm. These average particle diameters indicate the arithmetic average diameter on a volume basis when a frequency distribution of the particle sizes is measured by laser diffractometry. It is desirable that either or both of the metal powder and the metal compound powder contain either or both of flat metal powder and flat metal compound powder.

As the binder, the same type of binder as described in the corresponding paragraph of the honeycomb structure portion can be used. It is preferable that a content of the binder be from 0 to 10 parts by mass when a total mass of the oxide powder, the metal powder and the metal compound powder is 100 parts by mass.

It is preferable that a content of the water be from 0 to 500 parts by mass, when the total mass of the oxide powder, the metal powder and the metal compound powder is 100 parts by mass.

As the surfactant, the same type of surfactant described in the corresponding paragraph of the honeycomb structure portion can be used. It is preferable that a content of the surfactant be from 0.1 to 2.0 parts by mass, when the total mass of the oxide powder, the metal powder and the metal compound powder is 100 parts by mass.

Next, the obtained paste or slurry to form the outer peripheral side of the electrode portion is coated in a desired thickness on the inner peripheral side of the electrode portion. The coating thickness can be, but not limited to, from 20 to 500 µm and typically from 20 to 300 µm. The paste or slurry to form the outer peripheral side of the electrode portion may be coated on the paste or slurry to form the inner peripheral side of the electrode portion, which is coated on the outer surface of the outer peripheral wall of the honeycomb structure portion and is not fired yet. It is preferable to coat the slurry so that in the electrode portion, the longitudinal direction of the flat particles of the metal and/or the metal compound is oriented perpendicularly to the thickness direction of the electrode portion. A specific example of the coating method is the screen-printing method in which the shear force is applied in the peripheral direction along the outer peripheral direction of the electrode portion.

(2-5 Step of Firing Paste or Slurry to Form Outer Peripheral Side of Electrode Portion)

After the paste or slurry to form the outer peripheral side of the electrode portion is coated, the paste or slurry to form the outer peripheral side of the electrode portion is fired. To remove the binder and others prior to the firing, calcination may be performed. As firing conditions, it is preferable to perform heating at 950 to 1300° C. in an inert atmosphere of nitrogen, argon, vacuum or the like for 10 minutes to 120 minutes.

The paste or slurry to form the outer peripheral side of the electrode portion may be fired simultaneously with the firing of the paste or slurry to form the inner peripheral side of the electrode portion. Alternatively, the paste or slurry to form the outer peripheral side of the electrode portion may be fired simultaneously with the firing of the honeycomb formed body.

EXAMPLES

Hereinafter, examples will be illustrated for better understanding of the present invention and advantages of the invention, but the present invention is not limited to the examples.

Examples 1 to 34 and Comparative Examples 1 to 3

(1) Preparation of Honeycomb Structure Portion

Silicon carbide (SiC) powder, metal silicon (Si) powder and oxide powder (a mixture of alumina and silica) were mixed to obtain a mixture having a volume composition described in Table 1-1 in accordance with a test number, so that a ceramics raw material was prepared. A binder, surfactant, pore former and water were added to this raw material to prepare a forming raw material. The forming raw material was kneaded to prepare a greed body, and then the greed body was extruded to obtain a cylindrical honeycomb formed body in which a cross-sectional shape of each cell was square. The honeycomb formed body was dried, degreased and fired, thereby preparing a honeycomb structure portion concerned with each test example.

(2) Preparation of Inner Peripheral Side of Electrode Portion

Next, glass powder, stainless steel (SUS430) powder, Mo powder, TaC powder, TiN powder and SiC powder were mixed to obtain a mixture having a volume composition described in Table 1-2 in accordance with a test number. Water was added to this mixture, and stirred, so that slurry to form an inner peripheral side of an electrode portion was prepared.

A content of the water was set to 300 parts by mass when a total content of the glass powder, stainless steel powder, Mo powder, TaC powder, TiN powder and SiC powder was 100 parts by mass.

As glass, crystallized glass made of $MgO$—$SiO_2$—$Al_2O_3$—$B_2O_3$ was used. An average particle diameter of the glass powder was 1 µm, an average particle diameter of the stainless steel (SUS430) powder was 10 µm, an average particle diameter of the Mo powder was 6 µm, an average particle diameter of the TaC powder was 1 µm, an average particle diameter of the TiN powder was 1 µm, and an average particle diameter of the SiC powder was 2 µm.

Next, the slurry to form the inner peripheral side of the electrode portion in accordance with the test number was coated in a coating thickness described in Table 1-2 in accordance with the test number. The slurry was coated in a strip shape on two regions of a side surface of the honeycomb structure portion (an outer surface of an outer peripheral wall) across a total length between both end faces of the honeycomb structure portion so that a central angle of the slurry was 50 degrees when observed in a cross section of the honeycomb structure portion perpendicular to a flow path direction of cells. The two regions coated with the slurry to form the inner peripheral side of the electrode portion were arranged so that they are opposite to each other across a central axis of the honeycomb structure portion. A film thickness at this time was adjusted in accordance with a coating weight.

Next, the slurry to form the inner peripheral side of the electrode portion, which was coated on the honeycomb structure portion, was dried at 80° C. for 2 hours and then fired. As firing conditions, the firing under a vacuum atmosphere at 1100° C. for 30 minutes was set.

(3) Formation of Outer Peripheral Side of Electrode Portion

Next, glass powder, stainless steel (SUS430) powder, Mo powder, TaC powder, TiN powder and $ZrB_2$ powder were mixed to obtain a mixture having a volume composition described in Table 1-2 in accordance with a test number. Hydroxypropyl methylcellulose was added as a binder to this mixture, water was also added to the mixture, and the mixture was kneaded, so that slurry to form an outer peripheral side of the electrode portion was prepared.

A content of the water was set to 300 parts by mass when a total content of the glass powder, stainless steel powder, Mo powder, TaC powder, TiN powder and $ZrB_2$ powder was 100 parts by mass.

As glass, crystallized glass made of $MgO$—$SiO_2$—$Al_2O_3$—$B_2O_3$ was used. An average particle diameter of the glass powder was 1 µm, an average particle diameter of the stainless steel (SUS430) powder was 10 µm, an average particle diameter of the Mo powder was 6 µm, an average particle diameter of the TaC powder was 1 µm, an average particle diameter of the TiN powder was 1 µm, and an average particle diameter of the $ZrB_2$ powder was 1 µm.

Next, the slurry to form the outer peripheral side of the electrode portion in accordance with the test number was coated in a coating thickness described in Table 1-2 in accordance with the test number. Then, the slurry was coated over the entire inner peripheral side of each electrode portion. A film thickness at this time was adjusted in accordance with a coating weight.

Next, the slurry to form the outer peripheral side of the electrode portion, which was coated on the honeycomb structure portion, was dried at 80° C. for 2 hours and then fired. As firing conditions, the firing under a vacuum atmosphere at 1100° C. for 30 minutes was set.

A honeycomb structure concerned with each test example was prepared by the above described procedure. Note that such a number of the honeycomb structures of each test example as required for the following evaluations were prepared.

(4) Specifications of Honeycomb Structure

The obtained honeycomb structure concerned with each test example had a substantially cylindrical shape in which an end face had a round shape having a diameter of 114 mm and a length in a flow path direction of cells was 30 mm.

A shape of the cells in a cross section of the honeycomb structure perpendicular to the flow path direction of the cells was square.

A thickness of partition walls in the honeycomb structure portion was 127 µm.

A cell density was 62 cells/$cm^2$ in the cross section of the honeycomb structure perpendicular to the flow path direction of the cells.

(5) Appearance Inspection

As to the obtained honeycomb structure concerned with each test example, an appearance of the electrode portion was visually confirmed, and evaluated in accordance with the following criteria. Table 1-3 shows results in a column of "electrode" of "appearance after firing".

A: In the appearance of the electrode portion, there is not a discontinuity (cut) having a length of 3 mm or more, and there is not a position at which a substrate is visible through a crack of the electrode portion.

B: In the appearance of the electrode portion, there is a discontinuity (cut) having the length of 3 mm or more, or there is a position at which the substrate is visible through the crack of the electrode portion.

Furthermore, as to the obtained honeycomb structure concerned with each test example, the electrode portion was visually confirmed for presence/absence of a peel-off portion from the outer peripheral wall of the honeycomb structure portion, and evaluated in accordance with the following criteria. Table 1-3 shows results in a column of "electrode-substrate" of "appearance after firing".

A: The peel-off cannot be confirmed.

B: The peel-off can be at least partially seen.

(6) Energization Resistance

Terminals were connected to a pair of electrode portions of the obtained honeycomb structure concerned with each test example, a voltage was then applied on the above described measurement conditions, and an energization resistance was measured. Table 1-3 shows results.

(7) Compositions of Honeycomb Structure Portion, Inner Peripheral Side of Electrode Portion, and Outer Peripheral Side of Electrode Portion As to the obtained honeycomb structure concerned with each test example, the following volume ratios were obtained by the above described method. Table 1-2 and Table 1-3 show results.

Volume ratios of an oxide, metal silicon (Si) and silicon carbide (SiC) in the honeycomb structure portion Volume ratios of an oxide, and a metal and a metal compound (excluding a metal oxide) on the inner peripheral side of the electrode portion Volume ratios of an oxide, and a metal and a metal compound (excluding a metal oxide) on the outer peripheral side of the electrode portion As a scanning electron microscope (SEM), model S-3400N manufactured by Hitachi High-Technologies Corporation was used.

As an energy dispersive X-ray spectrometer (EDS), model EMAX EX-250 manufactured by HORIBA, Ltd. was used.

As image analysis software, "Image-Pro Plus 7.0J (tradename)" manufactured by Media Cybernetics, Inc. was used.

(8) Average Thickness of Electrode Portion

As to the electrode portion of the obtained honeycomb structure concerned with each test example, thicknesses of five or more positions were measured by the above described method, and an average thickness was calculated. As the SEM, EDS and image analysis software, models same as the above models were used. Table 1-3 shows results.

(9) Bonding Reliability (Preparation of Testing Honeycomb Structure Portion)

The same procedure as in "(1) Preparation of Honeycomb Structure Portion" was repeated except that a structure of the honeycomb structure portion was changed as follows, to prepare honeycomb structure portions concerned with Examples 1 to 34 and Comparative Examples 1 to 3 (see FIG. 5(a)).

Outer shape: a substantially quadrangular pillar shape in which an end face is square with each side of 35 mm and a height (a length in a flow path direction of cells) is 100 mm.

Shape of cells in a cross section perpendicular to the flow path direction of the cells: square Thickness of partition walls in the honeycomb structure portion: 300 μm Cell density: 47 cells/cm² in a cross section perpendicular to the flow path direction of the cells Subsequently, the honeycomb structure portion was roughly processed into a cuboid in which an end face had a rectangular shape with a size of about 20 mm×a thickness of two cells (about 3.3 mm). A height (a length in the flow path direction of the cells) of the configuration was 20 mm (FIG. 5(b)). Afterward, remaining protruding partition wall ends were removed with a grinding machine of #1000 so that opposite faces were parallel with each other. Thus, a necessary number of testing honeycomb structure portions were obtained (FIG. 5(c)).

(Preparation of Testing Laminated Portion)

The same procedure as in "(2) Formation of Inner Peripheral Side of Electrode Portion" was repeated, to prepare the slurry to form the inner peripheral side of the electrode portion concerned with Examples 1 to 34 and Comparative Examples 1 to 3. Two testing honeycomb structure portions produced for each test example as described above were prepared, and the slurry was coated in the coating thickness described in Table 1-2 on a larger side face of each of the two honeycomb structure portions so that a coated surface had a round shape with a 10 mm diameter. Afterward, the slurry to form the inner peripheral side of the electrode portion was dried at 80° C. for 2 hours, and then fired at a heating temperature of 1100° C. under a vacuum atmosphere for 30 minutes, so that two testing honeycomb structure portions were obtained to each of which the inner peripheral side of the electrode portion was attached.

Subsequently, the same procedure as in "(3) Formation of Outer Peripheral Side of Electrode Portion" was repeated, to prepare slurry to form the outer peripheral side of the electrode portion concerned with Examples 1 to 34 and Comparative Examples 1 to 3. The obtained slurry to form the outer peripheral side of the electrode portion was coated in the coating thickness described in Table 1-2 on the inner peripheral side of the electrode portion of one of the testing honeycomb structure portions to which the inner peripheral side of the electrode portion was attached, so that a coated surface had a round shape with a 10 mm diameter. Afterward, the inner peripheral side of the electrode portion of the other testing honeycomb structure portion to which the inner peripheral side of the electrode portion was attached was overlapped with the slurry to form the outer peripheral side of the electrode portion, and was dried at 80° C. for 2 hours, and then fired at a heating temperature of 1100° C. under a vacuum atmosphere for 30 minutes while applying a load of 10 g thereto. Consequently, a testing laminated body concerned with each of Examples 1 to 34 and Comparative Examples 1 to 3 was prepared. Each testing laminated body has a laminated structure of the honeycomb structure portion (110)/the inner peripheral side (120a) of the electrode portion/the outer peripheral side (120b) of the electrode portion/the inner peripheral side (120a) of the electrode portion/the honeycomb structure portion (110) (see FIG. 6).

(Initial Destruction Strength)

A jig for a tensile test was attached to each of upper and lower surfaces of the testing laminated body concerned with each test example via an adhesive, and a destruction strength in arrow directions of FIG. 6 was measured with a tensile tester (model 5564 manufactured by Instron Corp.). Table 1-4 shows results. A destruction strength of 2 MPa means that a destruction point is not present in an interface between the honeycomb structure portion and the electrode portion and is present inside the honeycomb structure portion. It is indicated that the honeycomb structure portion and the electrode portion have a high bonding strength.

(Destruction Strength After Endurance Test)

The testing laminated body concerned with each test example was heated from normal temperature (about 25° C.) up to 900° C., held for 1 hour, then cooled and held at normal temperature (about 25° C.) for 1 hour. This heating/cooling cycle was considered as one cycle, and the testing laminated body was subjected to 50 cycles. Afterward, the destruction strength was measured by the same method as in the above method of measuring the initial destruction strength. Furthermore, the destruction point at this time was observed with a microscope, and it was investigated whether the destruction point was positioned in the honeycomb structure portion or in the interface between the honeycomb structure portion and the electrode portion. Table 1-4 shows results.

TABLE 1-1

| | | Honeycomb structure portion Composition (vol %) | | |
|---|---|---|---|---|
| | | Si | SiC | Oxide |
| Example | 1 | 95.9 | 4.1 | 0.0 |
| | 2 | 95.9 | 4.1 | 0.0 |
| | 3 | 95.9 | 4.1 | 0.0 |
| | 4 | 95.9 | 4.1 | 0.0 |
| | 5 | 95.9 | 4.1 | 0.0 |
| | 6 | 95.9 | 4.1 | 0.0 |
| | 7 | 95.9 | 4.1 | 0.0 |
| | 8 | 95.9 | 4.1 | 0.0 |
| | 9 | 95.9 | 4.1 | 0.0 |
| | 10 | 95.9 | 4.1 | 0.0 |
| | 11 | 95.9 | 4.1 | 0.0 |
| | 12 | 95.9 | 4.1 | 0.0 |
| | 13 | 95.9 | 4.1 | 0.0 |
| | 14 | 95.9 | 4.1 | 0.0 |
| | 15 | 95.9 | 4.1 | 0.0 |
| | 16 | 95.9 | 4.1 | 0.0 |
| | 17 | 95.9 | 4.1 | 0.0 |
| | 18 | 95.9 | 4.1 | 0.0 |
| | 19 | 95.9 | 4.1 | 0.0 |
| | 20 | 95.9 | 4.1 | 0.0 |
| | 21 | 95.9 | 4.1 | 0.0 |
| | 22 | 95.9 | 4.1 | 0.0 |
| | 23 | 95.9 | 4.1 | 0.0 |
| | 24 | 95.9 | 4.1 | 0.0 |
| | 25 | 95.9 | 4.1 | 0.0 |
| | 26 | 95.9 | 4.1 | 0.0 |
| | 27 | 95.9 | 4.1 | 0.0 |
| | 28 | 95.9 | 4.1 | 0.0 |
| | 29 | 95.9 | 4.1 | 0.0 |
| | 30 | 32.7 | 62.0 | 5.3 |
| | 31 | 24.5 | 69.6 | 5.9 |
| | 32 | 25.9 | 49.1 | 25.0 |
| | 33 | 23.9 | 45.4 | 30.7 |
| | 34 | 23.0 | 43.7 | 33.3 |
| Comparative Example | 1 | 95.9 | 4.1 | 0.0 |
| | 2 | 95.9 | 4.1 | 0.0 |
| | 3 | 32.7 | 62.0 | 5.3 |

TABLE 1-2

| | | Electrode portion | | | | | | | | | | | | |
|---|---|---|---|---|---|---|---|---|---|---|---|---|---|---|
| | | Inner peripheral side | | | | | | Outer peripheral side | | | | | | |
| | | Composition (vol %) | | | | | | Coating thickness | Composition (vol %) | | | | | Coating thickness |
| | | SUS | MO | TaC | TiN | SiC | Glass | μm | SUS | Mo | TaC | TiN | ZrB$_2$ | Glass | μm |
| Example | 1 | | | | | | 100 | 10 | 40 | | | | | 60 | 75 |
| | 2 | 35 | | | | | 65 | 10 | 40 | | | | | 60 | 75 |
| | 3 | 30 | | | | | 70 | 10 | 40 | | | | | 60 | 75 |
| | 4 | 20 | | | | | 80 | 10 | 40 | | | | | 60 | 75 |
| | 5 | 10 | | | | | 80 | 10 | 40 | | | | | 60 | 75 |
| | 6 | | | | | | 100 | 5 | 60 | | | | | 40 | 40 |
| | 7 | | | | | | 100 | 5 | 70 | | | | | 30 | 30 |
| | 8 | | | | | | 100 | 5 | 100 | | | | | 0 | 30 |
| | 9 | | | | | | 100 | 10 | 35 | | | | | 65 | 75 |
| | 10 | | | | | | 100 | 5 | 30 | | | | | 70 | 50 |
| | 11 | | | | | | 100 | 5 | 20 | | | | | 80 | 50 |
| | 12 | | | | | | 100 | 5 | 10 | | | | | 90 | 50 |
| | 13 | | 10 | | | | 90 | 10 | 40 | | | | | 60 | 75 |
| | 14 | | | 20 | | | 80 | 10 | 40 | | | | | 60 | 75 |
| | 15 | | | | 20 | | 80 | 10 | 40 | | | | | 60 | 75 |
| | 16 | | | | | 20 | 80 | 10 | 40 | | | | | 60 | 75 |
| | 17 | | | | | | 100 | 10 | 40 | | | | | 60 | 150 |
| | 18 | | | | | | 100 | 10 | 40 | | | | | 60 | 230 |
| | 19 | | | | | | 100 | 10 | 40 | | | | | 60 | 300 |
| | 20 | | | | | | 100 | 3 | 40 | | | | | 60 | 30 |
| | 21 | | | | | | 100 | 3 | 40 | | | | | 60 | 75 |
| | 22 | | | | | | 100 | 5 | 40 | | | | | 60 | 75 |
| | 23 | | | | | | 100 | 50 | 40 | | | | | 60 | 75 |
| | 24 | | | | | | 100 | 90 | 40 | | | | | 60 | 75 |
| | 25 | | | | | | 100 | 100 | 40 | | | | | 60 | 75 |
| | 26 | | | | | | 100 | 10 | | 40 | | | | 60 | 75 |
| | 27 | | | | | | 100 | 10 | | | 40 | | | 60 | 75 |
| | 28 | | | | | | 100 | 10 | | | | 40 | | 60 | 75 |
| | 29 | | | | | | 100 | 10 | | | | | 40 | 60 | 75 |
| | 30 | | | | | | 100 | 10 | 40 | | | | | 66 | 75 |
| | 31 | | | | | | 100 | 10 | 40 | | | | | 60 | 75 |
| | 32 | | | | | | 100 | 10 | 40 | | | | | 60 | 75 |
| | 33 | | | | | | 100 | 10 | 40 | | | | | 60 | 75 |
| | 34 | | | | | | 100 | 10 | 40 | | | | | 60 | 75 |
| Comparative Example | 1 | 40 | | | | | 60 | 10 | 40 | | | | | 60 | 75 |
| | 2 | 50 | | | | | 50 | 10 | 40 | | | | | 60 | 75 |
| | 3 | 40 | | | | | 60 | 10 | 40 | | | | | 60 | 75 |

TABLE 1-3

| | | Electrode portion Oxide volume ratio | | | Electrode portion Average thickness μm | Appearance after firing | | Energization resistance Ω |
|---|---|---|---|---|---|---|---|---|
| | | Inner peripheral side vol % | Outer peripheral side vol % | Concentration difference vol % | | Electrode | Electrode-substrate | |
| Example | 1 | 100 | 60 | 40 | 85 | A | A | 2.7 |
| | 2 | 65 | 60 | 5 | 85 | A | A | 2.7 |
| | 3 | 70 | 60 | 10 | 85 | A | A | 2.7 |
| | 4 | 80 | 60 | 20 | 85 | A | A | 2.7 |
| | 5 | 80 | 60 | 20 | 85 | A | A | 2.7 |
| | 6 | 100 | 40 | 60 | 45 | A | A | 2.6 |
| | 7 | 100 | 30 | 70 | 35 | A | A | 2.6 |
| | 8 | 100 | 0 | 100 | 35 | A | A | 2.6 |
| | 9 | 100 | 65 | 35 | 85 | A | A | 2.8 |
| | 10 | 100 | 70 | 30 | 55 | A | A | 3.0 |
| | 11 | 100 | 80 | 20 | 55 | A | A | 6.7 |
| | 12 | 100 | 90 | 10 | 55 | A | A | 44.2 |
| | 13 | 90 | 60 | 30 | 85 | A | A | 2.7 |
| | 14 | 80 | 60 | 20 | 85 | A | A | 2.7 |
| | 15 | 80 | 60 | 20 | 85 | A | A | 2.7 |
| | 16 | 80 | 60 | 20 | 85 | A | A | 2.7 |
| | 17 | 100 | 60 | 40 | 160 | A | A | 2.7 |
| | 18 | 100 | 60 | 40 | 240 | A | A | 2.7 |

TABLE 1-3-continued

|   | | Electrode portion Oxide volume ratio | | | Electrode portion Average thickness μm | Appearance after firing | | Energization resistance Ω |
|---|---|---|---|---|---|---|---|---|
|   | | Inner peripheral side vol % | Outer peripheral side vol % | Concentration difference vol % | | Electrode | Electrode-substrate | |
|   | 19 | 100 | 60 | 40 | 310 | B | A | 2.7 |
|   | 20 | 100 | 60 | 40 | 33 | A | A | 2.7 |
|   | 21 | 100 | 60 | 40 | 78 | A | A | 2.7 |
|   | 22 | 100 | 60 | 40 | 80 | A | A | 2.7 |
|   | 23 | 100 | 60 | 40 | 125 | A | A | 2.9 |
|   | 24 | 100 | 60 | 40 | 165 | A | A | 3.1 |
|   | 25 | 100 | 60 | 40 | 175 | A | A | 3.2 |
|   | 26 | 100 | 60 | 40 | 85 | A | A | 2.7 |
|   | 27 | 100 | 60 | 40 | 85 | A | A | 2.9 |
|   | 28 | 100 | 60 | 40 | 85 | A | A | 2.9 |
|   | 29 | 100 | 60 | 40 | 85 | A | A | 2.9 |
|   | 30 | 100 | 60 | 40 | 85 | A | A | 3.1 |
|   | 31 | 100 | 60 | 40 | 85 | A | A | 3.1 |
|   | 32 | 100 | 60 | 40 | 85 | A | A | 3.1 |
|   | 33 | 100 | 60 | 40 | 85 | A | A | 3.1 |
|   | 34 | 100 | 60 | 40 | 85 | A | A | 3.2 |
| Comparative Example | 1 | 60 | 60 | 0 | 85 | A | B | 3.1 |
|   | 2 | 50 | 60 | −10 | 85 | A | B | 3.0 |
|   | 3 | 60 | 60 | 0 | 85 | A | A | 2.7 |

TABLE 1-4

|   | | Bonding reliability Destruction strength | | |
|---|---|---|---|---|
|   | | Initial MPa | After endurance test MPa | Destructed region after endurance |
| Example | 1 | 2 | 2 | Substrate |
|   | 2 | 2 | 2 | Substrate |
|   | 3 | 2 | 2 | Substrate |
|   | 4 | 2 | 2 | Substrate |
|   | 5 | 2 | 2 | Substrate |
|   | 6 | 2 | 2 | Substrate |
|   | 7 | 2 | 2 | Substrate |
|   | 8 | 2 | 2 | Substrate |
|   | 9 | 2 | 2 | Substrate |
|   | 10 | 2 | 2 | Substrate |
|   | 11 | 2 | 2 | Substrate |
|   | 12 | 2 | 2 | Substrate |
|   | 13 | 2 | 2 | Substrate |
|   | 14 | 2 | 2 | Substrate |
|   | 15 | 2 | 2 | Substrate |
|   | 16 | 2 | 2 | Substrate |
|   | 17 | 2 | 2 | Substrate |
|   | 18 | 2 | 2 | Substrate |
|   | 19 | 2 | 2 | Substrate |
|   | 20 | 2 | 2 | Substrate |
|   | 21 | 2 | 2 | Substrate |
|   | 22 | 2 | 2 | Substrate |
|   | 23 | 2 | 2 | Substrate |
|   | 24 | 2 | 2 | Substrate |
|   | 25 | 2 | 2 | Substrate |
|   | 26 | 2 | 2 | Substrate |
|   | 27 | 2 | 2 | Substrate |
|   | 28 | 2 | 2 | Substrate |
|   | 29 | 2 | 2 | Substrate |
|   | 30 | 2 | 2 | Substrate |
|   | 31 | 2 | 2 | Substrate |
|   | 32 | 2 | 2 | Substrate |
|   | 33 | 2 | 2 | Substrate |
|   | 34 | 2 | 2 | Substrate |
| Comparative Example | 1 | 1 | 1 | Interface |
|   | 2 | 1 | 1 | Interface |
|   | 3 | 2 | 1 | Interface |

Examples 35 to 41

Verification of Effects of Use of Flat Metal Particles

The same procedure as in Example 1 was repeated to prepare each honeycomb structure portion, form an inner peripheral side of an electrode portion and form an outer peripheral side of the electrode portion, except that as stainless steel (SUS430) powder for use in the slurry to form the outer peripheral side of the electrode portion, two types of powder, i.e., spherical powder (an average particle diameter of 10 μm) and flat powder (an average particle diameter of 30 μm) were prepared, and mixed at various volume ratios for use in accordance with respective test numbers, a blend ratio of the stainless steel (SUS430) powder and the glass powder in the slurry was changed to obtain a blend having a volume composition described in Table 2 in accordance with the test numbers, and the slurry was coated by use of screen printing. Thus, honeycomb structures concerned with respective test examples were prepared.

The electrode portion of the obtained honeycomb structure concerned with each test example was observed at a magnification of 500 times in a cross section of the honeycomb structure perpendicular to a flow path direction of cells through SEM observation, and a volume ratio of the flat SUS particles having an aspect ratio of from 2 to 100 in the dispersion phase was obtained on the basis of the above described calculating method. Table 2 shows results. For example, an average value of the aspect ratios of the flat SUS particles in Example 35 was about 3, which was obtained by the above described cross section observation with the SEM.

Furthermore, an electrode portion test piece having a shape of 5 mm (in a peripheral direction)×40 mm (in an axial direction)×75 μm (a thickness) was sampled from the obtained honeycomb structure concerned with each test example. Then, resistance of the test piece at room temperature in a direction perpendicular to a thickness direction of the test piece was measured by a four-terminal method, and a volume resistivity was calculated on the basis of the shape of the test piece. Table 2 shows results.

TABLE 2

| | Composition on outer peripheral side of electrode portion (vol %) | | Volume ratio of flat SUS | Volume resistivity of electrode portion |
|---|---|---|---|---|
| | SUS | Glass | (%) | (Ω · cm) |
| Example 35 | 30 | 70 | 100 | 0.0008 |
| Example 36 | 30 | 70 | 67 | 0.0011 |
| Example 37 | 30 | 70 | 50 | 0.0012 |
| Example 38 | 20 | 80 | 100 | 0.0089 |
| Example 39 | 20 | 80 | 67 | 0.0120 |
| Example 40 | 20 | 80 | 50 | 0.0260 |
| Example 41 | 40 | 60 | 0 | 0.0010 |

It is seen from the results of Table 2 that the volume resistivity of the electrode portion can be decreased when the volume ratio of the flat SUS particles is increased even if all the SUS particles have the same volume ratio on the outer peripheral side of the electrode portion. In other words, it can be seen that even if the SUS particles have the same volume resistivity, the volume ratio of all the SUS particles on the outer peripheral side of the electrode portion can be decreased by increasing the volume ratio of the flat SUS particles.

REFERENCE SIGNS LIST 100 honeycomb structure
110 honeycomb structure portion
112 outer peripheral wall
114 one end face
116 the other end face
118 partition wall
120 electrode portion
120a inner peripheral side of electrode portion
120b outer peripheral side of electrode portion
122 terminal connecting portion
130 terminal

What is claimed is:

1. A honeycomb structure comprising:
   a pillar-shaped honeycomb structure portion having an outer peripheral wall and partition walls disposed on an inner side of the outer peripheral wall and defining a plurality of cells extending from one end face to another end face to form flow paths; and at least an electrode portion disposed on an outer surface of the outer peripheral wall of the pillar-shaped honeycomb structure portion,
   wherein the pillar-shaped honeycomb structure portion is formed of ceramics containing either or both of Si and SiC,
   the electrode portion contains an oxide, and either or both of a metal and a metal compound, and
   a volume ratio of the oxide on an inner peripheral side of the electrode portion is higher than a volume ratio of the oxide on an outer peripheral side of the electrode portion, the inner peripheral side being a range having a size of 3 μm in a thickness direction from the interface between the electrode portion and the outer peripheral wall of the honeycomb structure portion toward the outer peripheral side of the electrode portion, and the outer peripheral side being a range having a size of 20 μm in the thickness direction from the outermost surface of the electrode portion toward the inner peripheral side of the electrode portion, and the outer peripheral side of the electrode portion contains the oxide.

2. The honeycomb structure according to claim 1, wherein a difference between the volume ratio of the oxide on the inner peripheral side of the electrode portion and the volume ratio of the oxide on the outer peripheral side of the electrode portion is 5% or more.

3. The honeycomb structure according to claim 1, wherein the volume ratio of the oxide on the inner peripheral side of the electrode portion is 65% or more.

4. The honeycomb structure according to claim 1, wherein the volume ratio of the oxide on the outer peripheral side of the electrode portion is 80% or less.

5. The honeycomb structure according to claim 1, wherein an average thickness of the electrode portion is from 25 to 300 μm.

6. The honeycomb structure according to claim 1, wherein the electrode portion contains an oxide of one or more elements selected from a group consisting of B, Mg, Al, Si, P, Ti and Zr.

7. The honeycomb structure according to claim 6, wherein the electrode portion contains an oxide of one or more elements selected from a group consisting of Mg, Al and Si.

8. The honeycomb structure according to claim 1, wherein at least a part of the oxide in the electrode portion is crystalline.

9. The honeycomb structure according to claim 1, wherein either or both of the metal and the metal compound contained in the electrode portion include one or more selected from a group consisting of stainless steel, nickel-chromium alloy, TaC, TiN and $ZrB_2$.

10. The honeycomb structure according to claim 1, wherein either or both of the metal and the metal compound contained in the electrode portion include flat particles, wherein the flat particles have an aspect ratio from 2 to 100.

11. The honeycomb structure according to claim 1, wherein an energization resistance of the honeycomb structure is 40Ω or less.

12. The honeycomb structure according to claim 1, wherein a volume ratio of an oxide in the pillar-shaped honeycomb structure portion is lower than the volume ratio of the oxide on the inner peripheral side of the electrode portion.

13. The honeycomb structure according to claim 1, wherein a volume ratio of an oxide in the pillar-shaped honeycomb structure portion is 35% or less.

14. The honeycomb structure according to claim 1, wherein a volume ratio of metal silicon in the pillar-shaped honeycomb structure portion is 20% or more.

* * * * *